United States Patent [19]

Suzuki et al.

[11] Patent Number: 4,616,876
[45] Date of Patent: Oct. 14, 1986

[54] ROTATION ADJUSTING APPARATUS

[75] Inventors: Hiroshi Suzuki; Masatatsu Kanai; Seishiro Saitoh; Shigeru Kanai, all of Tokyo, Japan

[73] Assignee: Tachikawa Spring Co., Ltd., Tokyo, Japan

[21] Appl. No.: 752,079

[22] Filed: Jul. 3, 1985

[30] Foreign Application Priority Data

Aug. 31, 1984 [JP] Japan .................... 59-182144
Mar. 28, 1985 [JP] Japan .................... 60-64559

[51] Int. Cl.4 ............................ B60N 1/02
[52] U.S. Cl. ...................... 297/328; 297/367; 248/397
[58] Field of Search .......... 297/367, 327, 328; 248/397, 394, 396

[56] References Cited

U.S. PATENT DOCUMENTS 3,695,570 10/1972 Ishida .................... 248/397
4,067,533 1/1978 Kazaoka et al. ............ 297/328 X
4,533,027 8/1985 Otani et al. ............... 297/328 X Primary Examiner—Francis K. Zugel
Attorney, Agent, or Firm—Murray Schaffer

[57] ABSTRACT

A base bracket is fixed to a driven shaft and a fixed gear, a lock gear rotatably supported by the base bracket and engageable with the fixed gear, a guide bracket rotatably supported by the base bracket, a handle slidably supported by the base bracket, a member for coupling the guide bracket to the lock gear and a member fixed to the handle and for rotating the guide bracket when the handle is slid relative to the base bracket, wherein the handle is slidably extended most outwardly from the base bracket, the guide bracket is rotated by the rotating member relative to the base bracket and the lock gear is also rotated through the coupling member so that the engagement between the lock gear and the fixed gear is released whereby the base bracket and hence the shaft can be rotatable by the handle.

6 Claims, 13 Drawing Figures

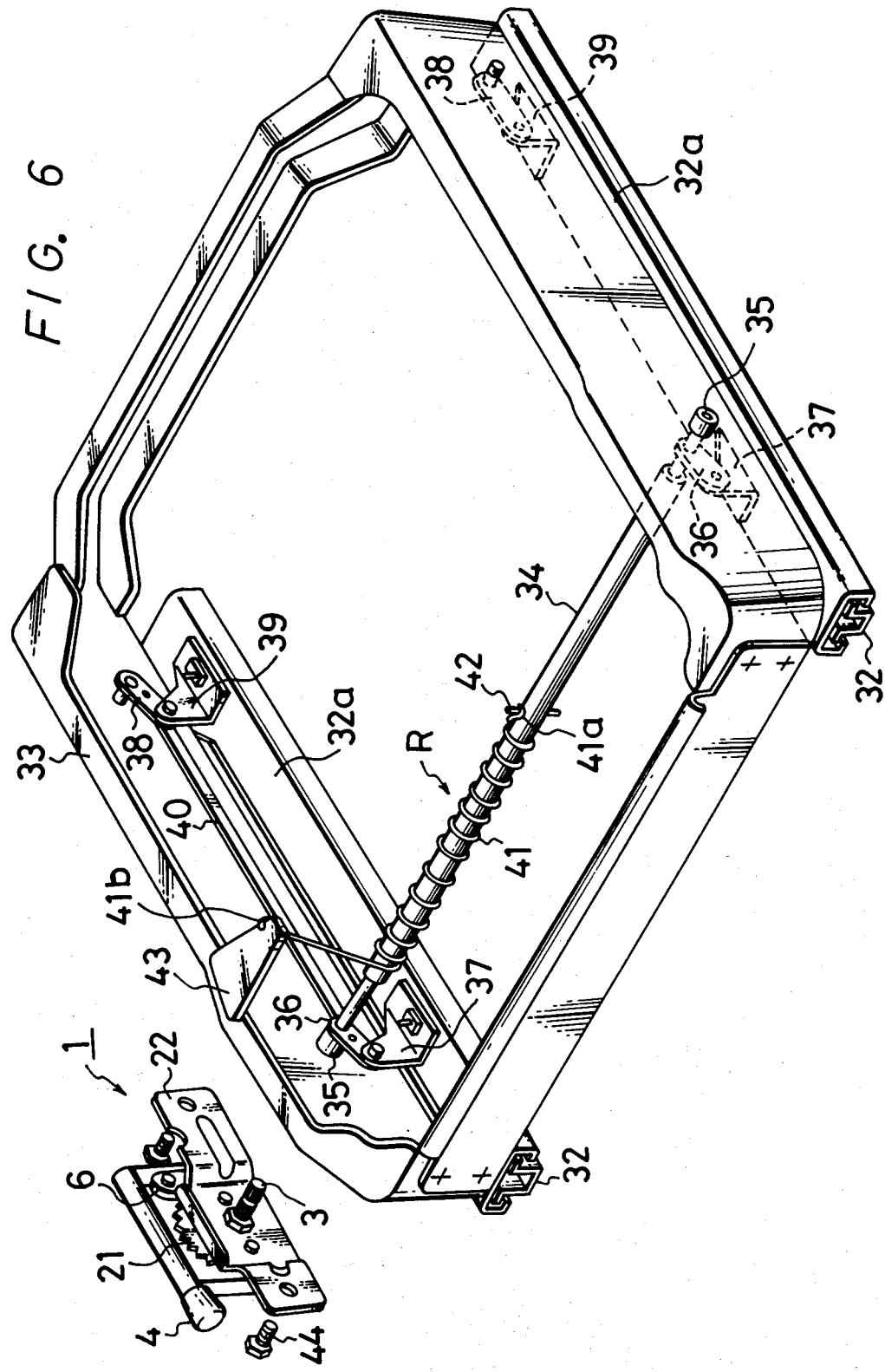

ROTATION ADJUSTING APPARATUS

BACKGROUND OF THE INVENTION

1. Field of the Invention

The present invention relates generally to a rotation adjusting apparatus and, more particularly, is directed to apparatus for adjusting the height or angle of the seats of an automobile.

2. Description of the Prior Art

In the prior art seats for automobiles and the like, the sitting height and/or sitting angle can be changed in accordance with driver's physique and taste.

In such seats hinge arms provided in the front and rear of the seat frame are pivoted to leg members which are fixed to a seat adjuster provided along the floor. The seat frame is moved up and down by the turning force acting on the hinge arms. An operating apparatus is coupled to the hinge arms and the height of the seat is adjusted by operating this operating apparatus. This operating apparatus employs a friction brake as a lock mechanism which disables the lifting operation at the desired height of the seat.

By way of example, such prior art brake apparatus is disclosed in the published document of unexamined Japanese patent application No. 29827/1984. This brake apparatus includes a brake drum which is fixed to a seat frame within which there are respectively provided a lever plate which is fixed to a drive shaft supported at a center opening of a drum bottom wall and a hanger engaged with the drive shaft so as to be rotatable and which is fixed to a shaft to be driven through a serration. A handle is fixed to the drive shaft and a coupling member for the seat lifting mechanism is attached to the shaft to be driven. A pair of guides are provided between the lever plate and the hanger and both guides are coupled to both ends of a brake spring that is urged against the inner peripheral surface of the brake drum. There is provided a contact portion. This contact portion contacts the hanger to thereby inhibit the hanger from moving when the lever plate is stopped. Further, there is provided a cam portion which is engaged with the lever plate when the lever plate is rotated. According to this friction brake apparatus, upon the initial rotation of the lever plate, the contact protion is swayed by the engagement between the cam portion and the lever plate to thereby release it from contact with the hanger and thus forming a spacing or clearance between the contact portion and the hanger. By this clearance, the diameter of the brake spring is reduced so as to decrease its force contacting the inner peripheral surface of the brake drum, whereby the friction brake is released, and the shaft to be driven is made rotatable.

In this prior art friction brake apparatus, the shaft to be driven is friction-locked by contacting the brake spring with the inner peripheral surface of the brake drum so that when a large load acts in the downward direction such as an impact force applied to the seat, applying a rotating force on the shaft to be driven the brake spring is slidably moved within the brake drum and thus there is a fear that the seat will be moved downward beyond the predetermined height. Further, since the brake operation is carried out by increasing or decreasing the winding diameter of the brake spring, it is very difficult to precisely lock the seat at a desired height. In addition, upon operation, a so-called dragging phenomenon in which the brake spring is slidably moved in contact with the inner peripheral surface of the brake drum will occur. There is then a defect that the operation is not carried out smoothly.

OBJECTS AND SUMMARY OF THE INVENTION

It is an object of this invention to provide a rotation adjusting apparatus in which a shaft to be driven is locked by the engagement of gears and the shaft to be driven is released from being locked by the slidable extension of a handle so that a seat height adjusting apparatus or the like ganged with the shaft to be driven can be locked positively.

It is another object of this invention to provide a rotation adjusting apparatus in which the lock releasing operation and the rotation adjusting operation can be carried out smoothly.

It is a further object of this invention to provide a rotation adjusting apparatus of a simple construction which can reduce the number of assembly parts so that a manufacturing cost can be decreased.

According to one aspect of this invention, there is provided a rotation adjusting apparatus comprising:

(a) a base bracket fixed to ashaft to be driven;
(b) a fixed gear;
(c) a lock gear rotatably supported by the base bracket and engageable with the fixed gear;
(d) a guide bracket rotatably supported by the base bracket;
(e) a handle slidably supported by the base braket;
(f) means for coupling the guide bracket to the lock gear; and
(g) means fixed to the handle for rotating the guide bracket when the handle is slid relative to the base bracket, wherein the handle is slidably extended most outwardly from the base bracket, the guide bracket is rotated by its rotating means relative to the base bracket and the lock gear is also rotated through the coupling means so that the engagement between the lock gear and the fixed gear is released whereby the base bracket and hence the shaft can be rotatable by said handle.

These and other objects, features and advantages of the present invention will become apparent from the following detailed descriptions of the preferred embodiments taken in conjunction with the accompanying drawings.

BRIEF DESCRIPTION OF THE DRAWINGS

FIG. 6 is a partly exploded perspective view illustrating a cushion frame portion of the seat shown in FIG. 5;

DESCRIPTION OF THE PREFERRED EMBODIMENTS

The present invention will hereinafter be described in detail with reference to the attached drawings.

Figure 1:
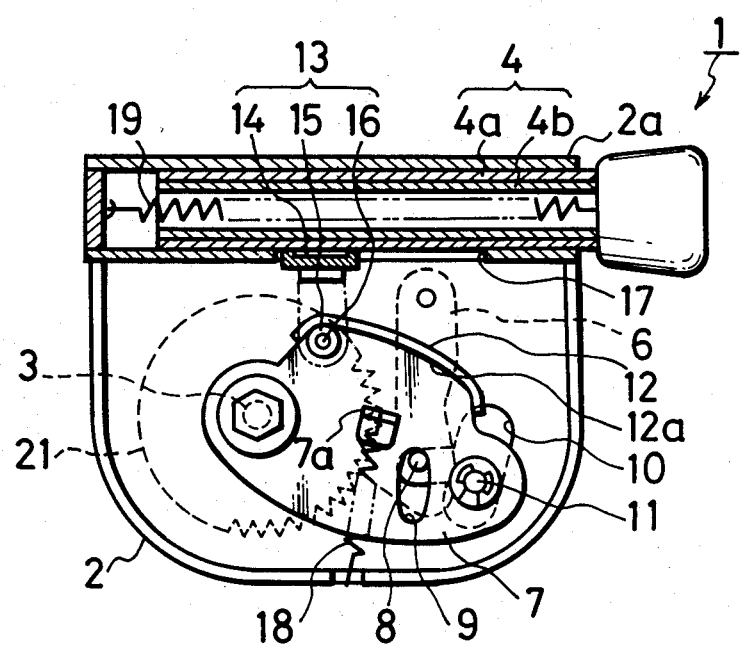
FIG. 1 is a longitudinally cross-sectional outer side view of a first embodiment of a rotation adjusting apparatus according to the present invention.
Figure 5:
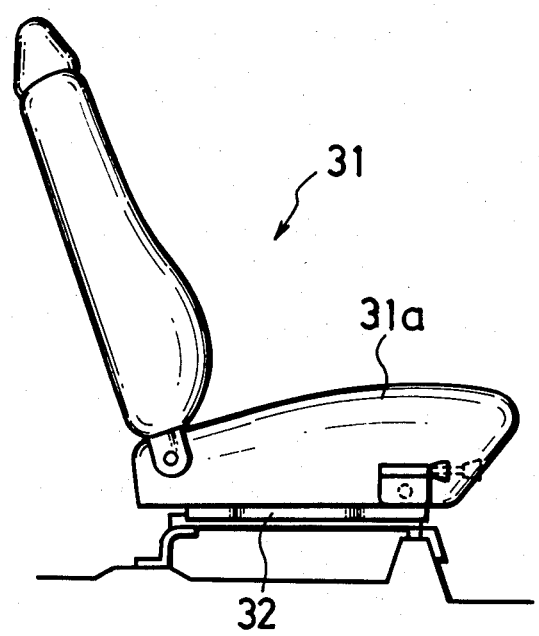
FIG. 5 is a side view illustrating a seat of the automobile having the rotation adjusting apparatus of the invention shown in FIG. 1.
Figure 2:
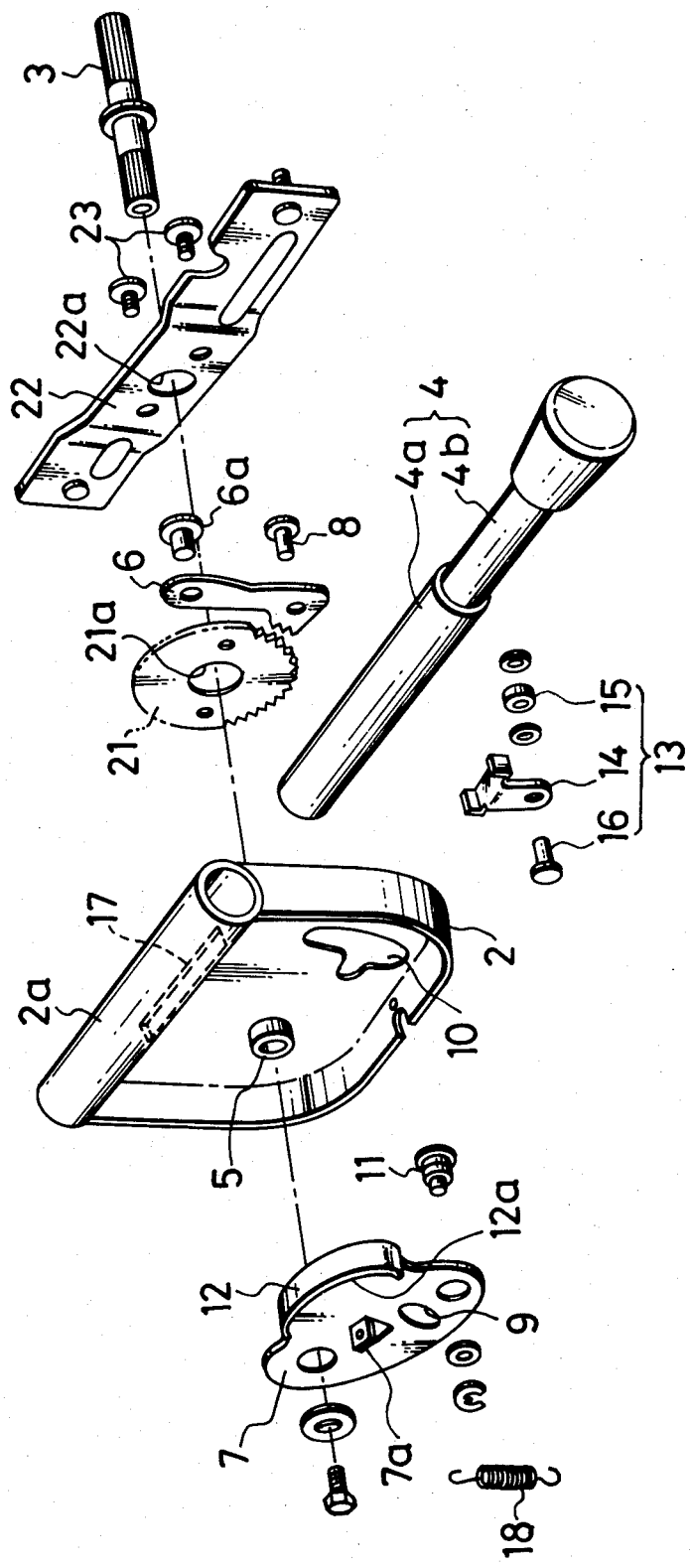
FIG. 2 is an exploded perspective view of the rotation adjusting apparatus of FIG. 1.
Figure 3:
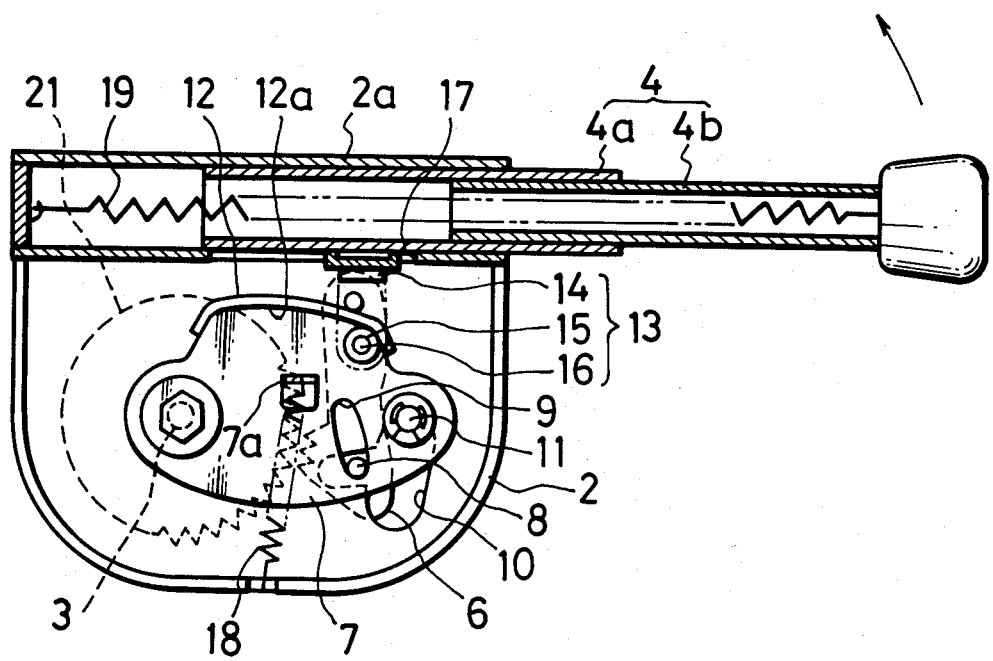
FIGS. 3 and 4 are respectively longitudinally inner side views useful for explaining the operation state of the apparatus shown in FIG. 1.
Figure 4:
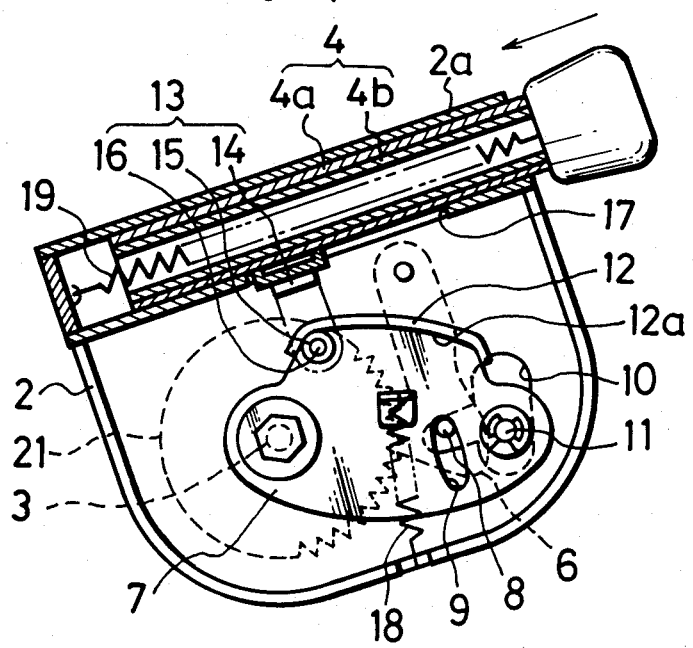

FIGS. 1 to 4 are respectively diagrams showing a first embodiment of a rotation adjusting apparatus according to this invention. FIG. 5 is a diagram showing an example of a seat of automobile in which the rotation adjusting apparatus of the invention is used as a seat height adjusting apparatus. FIG. 6 is a diagram showing the state wherein the rotation adjusting apparatus of the invention is attached to a cushion frame portion of the above-described seat of automobile.

In FIGS. 1 to 4, reference numeral 1 generally designates a rotation adjusting apparatus 1 formed of a movable side member and a fixed side member. Reference numeral 2 designates a base bracket serving as a movable side member fixed to a shaft 3 to be driven, that is, coupled to, for example, a height adjusting apparatus which will be described later. This base bracket 2 is of a housing shape in which an edge frame is formed integral with its outer peripheral edge. On the upper edge portion of the base bracket 2, there is provided a cylindrical guide member 2a which accommodates therein a handle 4 that is formed by coupling an outer cylinder 4a and an inner cylinder 4b in a telescoping manner so as to become extendable. At substantially the center portion of the base bracket 2, there is fixedly inserted a bush 5 which is fixed to the shaft 3 to be driven through a serration. To the inner side surface of this base bracket 2 and at the portion thereof distant from the fixed portion of the shaft 3 to be driven, there is pivoted a lock gear 6 through a pin 6a that is meshed with a fixed gear 21 which will be described later. To the outer side surface of the base bracket 2, there is provided a guide bracket 7 which is engaged with the lock gear 6 to thereby become rotatable around the bush 5. The lock gear 6 and the guide bracket 7 are engaged with each other by inserting a pin 8 erected on the lock gear 6 into a deformed long opening 9 formed through the guide bracket 7 through a guide groove 10 that is formed through the base bracket 2. Protruding from the outer point of the guide bracket 7, is a roller pin 11 that is slid along the outer edge side, or the side edge portion opposing to the engaged portion of the lock gear 6 in accordance with the rotation of the guide bracket 7.

On the upper edge of this guide bracket 7, there is formed a protruding cam piece member 12 which slidably contacts a slide assembly 13 which is attached to the outer cylinder 4a of the handle 4. This side assembly 13 is formed such that a roller 15 is pivoted to a bracket 14, which is fixed to the outer cylinder 4a of the handle 4, by a pin 16 in a cantilever fashion. The bracket 14 protrudes into the base bracket 2 through a long opening 17 formed in the axial direction of the cylindrical guide portion 2a of the base bracket 2 to thereby rotatably contact the roller 15 with the under surface 12a of the cam piece member 12 of the guide bracket 7.

In the guide bracket 7, a coil spring 18 is stretched between an erect member 7a protruding at substantially the center portion of the guide bracket 7 and the lower edge of the base bracket 2 to thereby always bias the lock gear 6 so as to become rotatable to the direction of the fixed gear 21 which will be described later. In order for the handle 4 to be always accommodated in the cylindrical guide portion 2a of the base bracket 2, a spring 19 is tensioned between the point of the inner cylinder 4b and the rear end of the guide cylindrical portion 2a.

Reference numeral 21 designates the fixed gear which is fixed to a fixed side member such as a cushion frame or the like through a mounting bracket 22 so as to be coaxial with the above-described shaft 3 to be driven. More particularly, an opening 21a for the insertion of the shaft 3 is formed through the center of the fixed gear 21 and an opening 22a is formed through the mounting bracket 22, so that when both openings 21a and 22a are made coincident with each other, the fixed gear 21 and the mounting bracket 22 are coupled with each other by rivets 23 to thereby fix the mounting bracket 22 to the fixed member.

The operation of the rotation adjusting apparatus 1 which is formed for the movable side member and the fixed side member will be described below.

When the handle 4 is shortened and is accommodated into the cylindrical guide portion 2a of the base bracket 2, the bracket 14, attached to the outer cylinder 4a as the slide member, is in the backward position. Thus, the roller 15, pivoted to the bracket 14, is in rotatable contact with the cam surface 12a of the cam piece member 12 of the guide bracket 7 at its rear end portion, or the pivoted portion side of the guide bracket 7. Accordingly, the guide bracket 7 is rotatably biased downward by the spring 18 and the lock gear 6, through the pin 8, engages with the guide bracket 7 and with the fixed gear 21 (in the state of FIG. 1). In this state the roller pin 11 is in rotatable contact with the outer edge side of the point portion of the lock gear 6. Thus the base bracket 2 is unable to rotate and the shaft 3 is put in the locked state.

From this state, if the handle 4 is extended or drawn out from the cylindrical guide portion 2a, the bracket 14 is moved forward. The roller 15 is then rotated and moved forward in contact with the cam surface 12a of the cam piece member 12 of the guide bracket 7 so that the cam piece member 12 is applied with a lifting force. Consequently, the guide bracket 7 is rotated upward around the pivoted portion of the bush 5 against the biasing force of the spring 18 so that the pin 8 of the lock gear 6 is pressed by the edge portion of the deformed long opening 9 and thus the lock gear 6 is rotated in the backward direction, or in the direction being remote from the fixed gear 21. As a result, the lock gear 6 is released from engagement with the fixed gear 21 and the shaft 3 is released from its locked position (see FIG. 3).

Under this condition, if the handle 4 is lifted upward or lowered, the shaft 3 is rotated relative to the base bracket 2 to thereby operate the adjusting mechanism which is coupled to the shaft 3.

When the shaft 3 is rotated by a desired amount, if the handle 4 is released from the hand, the handle 4 is shortened by the biasing force of the spring 19 and then accommodated into the cylindrical guide portion 2a. In other words, the inner cylinder 4b is inserted into the outer cylinder 4a, while the outer cylinder 4a is inserted into the cylindrical guide portion 2a and thereby accommodated thereinto. By virtue of this operation, the bracket 14 is moved backward to thereby rotate and move the roller 15 backward along the cam surface 12a of the cam piece member 12 of the guide bracket 7, thus releasing the cam piece member 12 from being lifted. Consequently, as the guide bracket 7 is rotated downward by the biasing force of the spring 18 and then returned to the original position, the lock gear 6 is rotated forward by its engagement between the pin 8 and the long opening 9 and is then engaged with the fixed gear 21 so that the shaft 3 is locked against rotation as earlier noted and thus the adjusting mechanism is held in its operation state (see FIG. 4).

If the rotation adjusting apparatus 1 is further changed from this operation state or returned to the original state once again, the lock releasing operation and the rotation operation of the aforementioned shaft 3 must be carried out.

In the above-described arrangement, since the slide assembly 13, which is attached to the handle 4 and is in slidable contact with the cam surface 12a of the cam piece member 12 of the guide bracket 7, is formed by pivoting the roller 15 to the bracket 14, and the roller 15 is rotatably moved in contact with the cam surface 2a of the cam piece member 12 of the guide bracket 7, in the lock releasing operation of the lock gear 6, the handle 4 can be slidably drawn out smoothly so as to rotate the guide bracket 7. The sliding force of the handle 4 can be decreased because as the handle 4 is slidably drawn out, the roller 15 is moved in the forward direction of the cam piece member 12, or in the direction becoming remote from the pivoted portion of the guide bracket 7. On the other hand, the guide bracket 7 is applied with a strong tension from the spring 18 in the direction opposite to the direction in which the guide bracket 7 is rotated by the movement of the roller 15, so that the increase of the tension and the decrease of the sliding force cancel each other out, and thus the sliding force, or the operating force of the handle 4 is always constant.

In the operation of shortening of the handle 4, or in the locking operation of the lock gear 6, a rotating force given by the spring 18 to the guide bracket 7 is added to the force given by the spring 19 to the handle 4 via the roller 15. In this manner the handle 4 is rapidly shortened and in association therewith, the guide bracket 7 is rotated and then returned, thus the lock gear 6 engaging with the fixed gear 21, serves as the fixed side member and the base bracket 2, which is fixed to the shaft 3, is once again locked to the fixed member.

While in the above described embodiment the handle 4 is formed as a two-stage telescope with an outer cylinder 4a and the inner cylinder 4b, it may be possible to form the handle 4 as a telescope type of more than two stages. Further, the handle 4 may be formed as one rod-shaped member or as a cylindrical member. When the handle 4 is formed as a rod shaped member, the handle extension length and the movable length of the bracket 14 of the slide assembly 13 for rotating the guide bracket 7 become equal to each other so that the handle extension or drawn out length can be made mechanically shorter than that of the telescope type. Furthermore, the slide assembly 13 is not limited to one that is formed by pivoting the roller 15 to the bracket 14, as mentioned above, but may be formed without the roller 15, while the bracket 14 is slidably moved in direct contact with the cam piece member 12 of the guide bracket 7, with a similar operation being carried out. Further, the cam piece member 12 of the guide bracket 7 may be formed on the lower edge side thereof.

In addition, the positional relation of the lock gear 6 and the guide bracket 7 relative to the fixed gear 21 may be reversed, or they may be positioned at the front side of the fixed gear 21. The tooth portion of the fixed gear 21 is not necessarily formed around the whole of the periphery thereof, but may be formed in accordance with the rotational range of the shaft 3. Other parts and members are not limited to those of this embodiment, but can take various modifications and variations.

Referring to FIGS. 5 and 6, the rotation adjusting apparatus 1 described above will be described more fully in an exemplary use as the operating apparatus for the lifter mechanism of an automobile.

FIG. 5 shows the whole of the seat of an automobile that is provided with the above described rotation adjusting apparatus 1. In FIG. 5, reference numeral 31 generally designates a seat mounted through a slide rail 32 to the floor of a body of an automobile.

A seat cushion 31a is provided incorporating therein a lifter mechanism R which will be described later. When this lifter mechanism R is operated by the above described rotation adjusting apparatus 1, the lifter mechanism R is moved up and down relative to the slide rail 32, thus adjusting the height of the seat cushion 31a.

FIG. 6 schematically illustrates the lifter mechanism mounted to the seat cushion 31a via a cushion frame 33. As shown in FIG. 6, respective members constituting the lifter mechanism R are located in the front and rear portions of the cushion frame 33 and the slide rail 32. More specifically, the front side members of the lifter mechanism R are such that a lifter operating shaft 32 is rotatably extended at the front portion of the cushion frame 33. Both ends of the lifter operating shaft 34 are supported in bearings 35 that are provided at the front portion of both sides of the cushion frame 33. Arms 36 are fixed to the lifter operating shaft 34 inside the sides of the cushion frame 33 and the free ends of the arms 36 are pivotally attached to leg members 37. The leg members 37 are respectively fixed to the body floor side, or the upper rails 32a of the slide rail 32 by bolts and nuts or the like.

A second set of arms 38 are pivotally connected to the rear insides of both sides of the cushion frame 33 and the free end portions of the arms 38 are pivotally connected to a second set of leg membes 39 which are respectively fixed to the body floor side or to the rear of the upper rails by bolts, nuts or the like. The leg members 37 and 39 are fixed to the upper rail 32a such that a straight line connecting the fixed point of the front side arm 36 to the lifter operation shaft 34, or its pivoted point to the side of cushion frame 33 with the pivoted point of the arm 36 to the leg members 37 becomes parallel to a straight line connecting the pivoted point of the rear arms 38 to the cushion frame 33 side with its pivoted point to the leg members 39.

A coupling link 40 is pivotally attached to the intermediate portions of the front and rear arms 38 of the lifter mechanism R at least along one side. Around the lifter operating shaft 34 there is wound a torsion spring 41, one end 41a of which is engaged with a knock pin 42 protruding from the lifter operating shaft 34, while its other end 41b is engaged with a retainer 43 protruding from one side of the cushion frame 33. This gives a biasing force to the lifter operating shaft 34 so as to urge the arm 36 to rotate around its pivoted portion to the leg portion 37 in the erecting direction. The rotation of the arm 36 is transmitted through the coupling link 40 to the rear arm 38 to cause the rear arm 38 to be rotated around its pivoted attachment to the leg member 39 in the erecting direction. Thus, the cushion frame 33 is always biased in the rising direction relative to the slide rail 32.

The rotating adjustment apparatus 1 of the operating apparatus of the lifter mechanism R for biasing the cushion frame 33 in the upward direction is mounted at the end portion of the lifter operating shaft 34 on the outside surface of one side of the cushion frame 33.

More particularly, in the condition where the end of the shaft 3 protruding from the insertion opeing of the bracket 22 is coupled to the lifter operating shaft 34 through its serrated or fluted end, the mounting bracket 22 with the fixed gear 21 attached thereto is fixed to the outer side surface of the cushion frame 33 by a fixing member 44 such as bolts and nuts.

When operating the rotation adjusting apparatus 1 mounted to the lifter mechanism R as mentioned above, the lifter mechanism R is operated and/or locked so that the height of the cushion frame 33 can be variably adjusted.

That is, when the rotation adjusting apparatus 1 is manipulated as mentioned above, or if the lock gear 6 is separated from the fixed gear 21 by drawing out the handle 4 to thereby release the shaft 3 from locking, the lifter mechanism R is lifted by the biasing force of spring 41 to thereby lift up the cushion frame 33. When the handle 4 is returned to the original condition at the desired height of the frame 33, the lock gear 6 is again engaged with the fixed gear 21 and the shaft 3 is locked, and thus the cushion frame 33 is held at the desired height. As described above, it is possible to variably adjust the height of the seat 31 as is desired.

If in the above mentioned lifter mechanism R the rear arm 38 and the coupling link 40 are removed and the rear portion of the cushion frame 33 is directly pivoted to the rear leg member 39, a tilt mechanism is formed so that by the rotation of the above described lifter operation shaft 34, it becomes possible to adjust the height of only the front side of the cushion frame 33, or the inclination angle of the seat cushion 31a.

The lifter mechanism R and the tilt mechanism to which the rotation adjusting apparatus 1 of this invention is applied are not limited to the above described forms but may be such other mechanisms having a lifter operation shaft that is always rotatably biased in one direction by biasing means.

Figure 7:
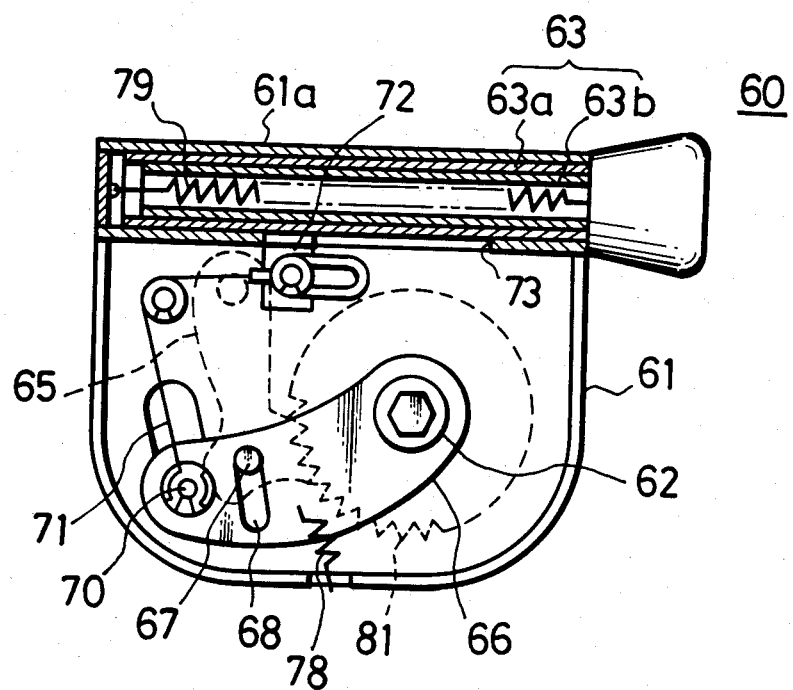
FIG. 7 is a longitudinally cross sectional outer side view of a second embodiment of the rotation adjusting apparatus according to the present invention.
Figure 8:
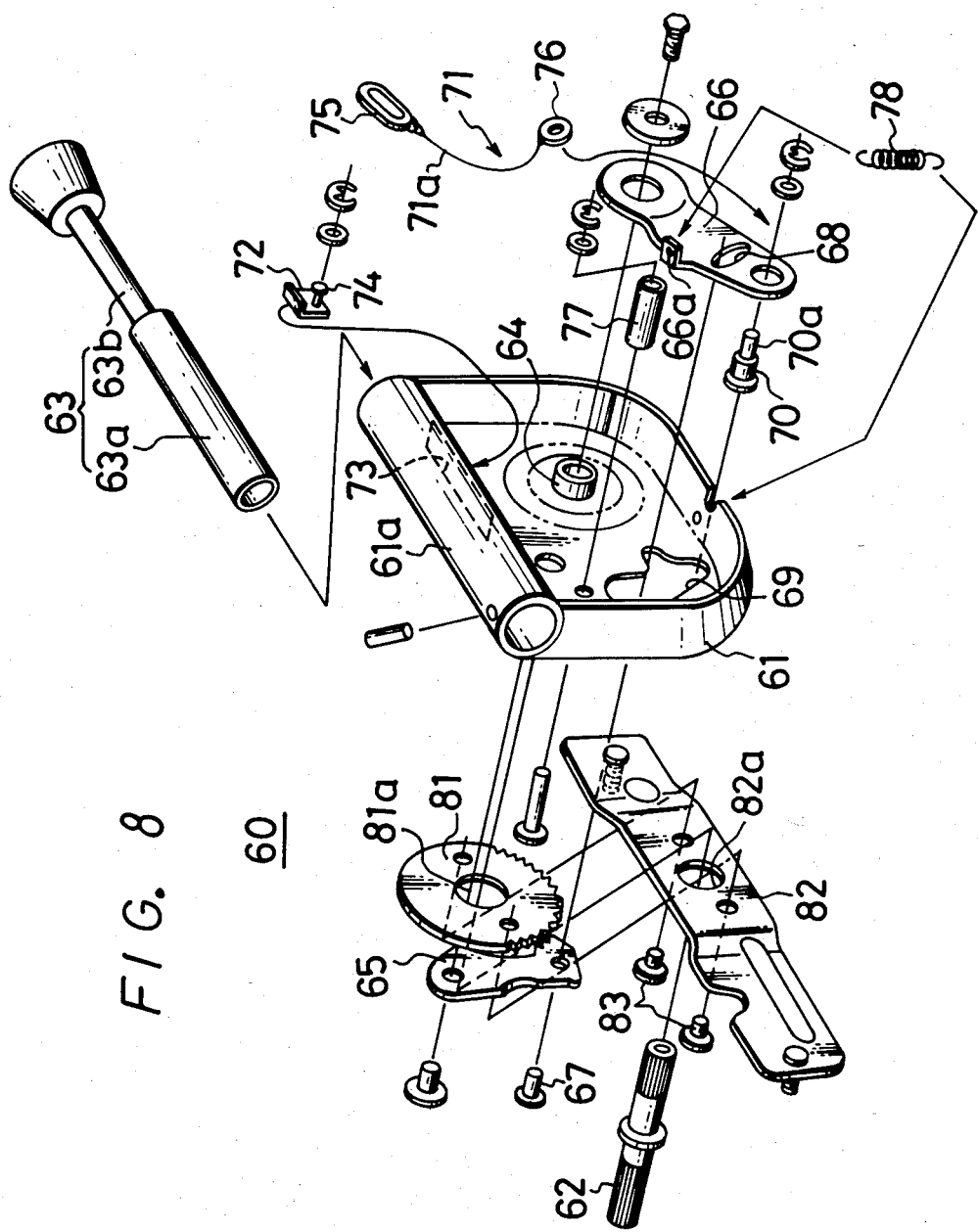
FIG. 8 is an exploded perspective view of the apparatus of FIG. 7.
Figure 9A:
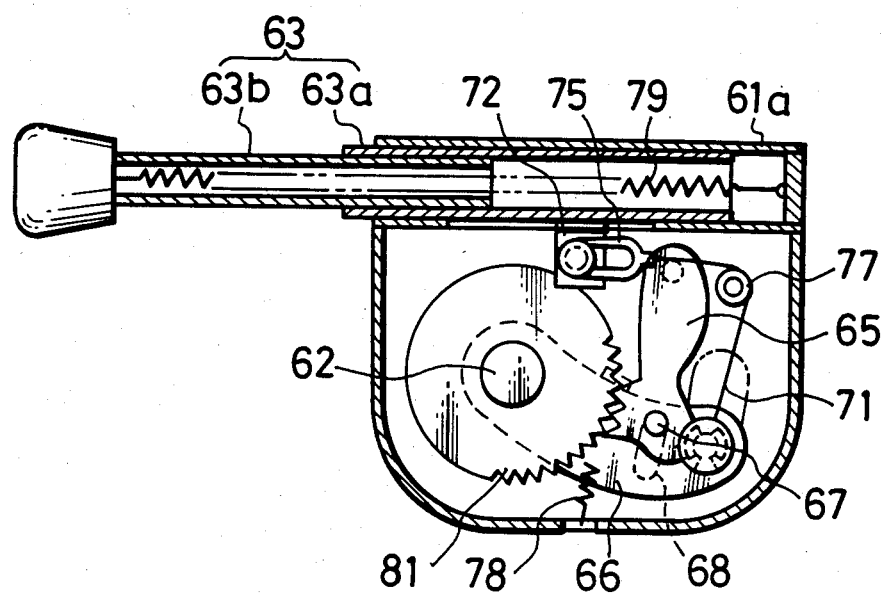
FIGS. 9A and 9B are respectively longitudinally cross-sectional inner side views useful for explaining the operation state of the apparatus shown in FIG. 7.
Figure 9B:
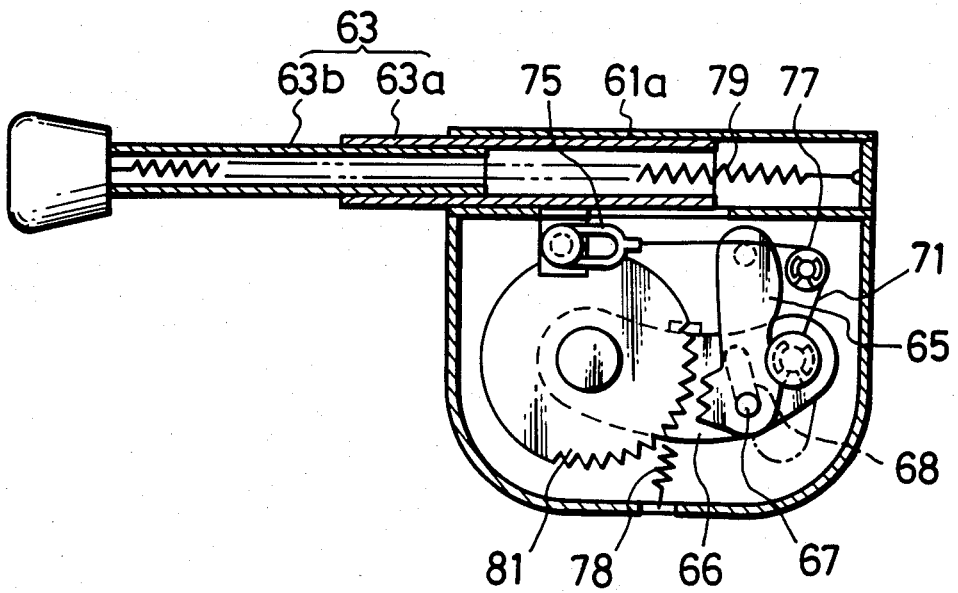

FIGS. 7 to 9 are respectively diagrams showing a second embodiment 60 of the rotation adjusting apparatus according to the present invention. The rotation adjusting apparatus 60 shown in FIGS. 7 to 9 is formed of a movable side member and a fixed side member. Reference numeral 61 designated a base bracket serving as the movable side member fixed to a rotatable shaft 62 that is coupled to, for example, a height adjusting apparatus which will be described later. The base bracket 61 is in the form of a housing in which an edge frame is formed integral on the outer peripheral edge of a connecting wall. On the upper edge portion of the base bracket 61 there is provided a cylindrical guide member 61a which accommodates therein a handle 63 that is formed by coupling an outer cylinder 63a and an inner cylinder 63b in a so called telescoping manner so that the handle 63 is extendable. At substantially the center of the base bracket 61, there is fixedly inserted a bush 64 which is fixed to the shaft 62 to be driven through a serration. On the inner surface of the base bracket 61 and at a point distant from the fixed portion of the shaft 62 there is pivoted a lock gear 65 that meshes with a fixed gear 81 which will be described later. On the outer surface of the base bracket 61 there is provided an arcuate guide bracket 66, which is at its center rotatable around the bush 64 and at its lower end engages with the lock gear 65 by a lock pin 67 extending from the lock gear 65 which is inserted through a long opening 68 formed through the guide bracket 66 and through a guide groove 69 that is formed through the base bracket 61. At the outermost point of the guide bracket 66 there is provided a roller pin 70 that protrudes laterally to slide along the outer edge of the lock gear 65 or its side edge portion opposite to the engaged portion in accordance with the rotation of the guide bracket 66.

The forward end of the guide bracket 61 is coupled through a wire assembly 71 to the outer cylinder 63a of the handle 63. More particularly, a bracket 72 protrudes from the outer cylinder 63a of the handle 63 through a long axial opening 73 formed through the guide portion 61a to the inside of the base bracket 61. A pin 74 extends laterally from the bracket 72 over which a long oblong shaped ring 75 of a predetermined length passes to which is fixed one end of a wire 71a. The intermediate portion of the wire 71a is wound around a guide pin 77 extending laterally from the outer side surface of the base bracket 61, and a ring 76 is fixed to the lower end of the wire 71a which engages over a pin 70a integrally extending from the roller pin 70. Thus, the guide bracket 66 is coupled to the handle 63. A coil spring 78 is stretched between an erect tab 66a protruding from the rear edge of the guide bracket 66 and the edge of the base bracket 61. The guide bracket is thus biased so that the lock gear 65 is rotated always in the direction to the fixed gear which will be described later. In order for the handle 63 to be always biased in the cylindrical guide portion 61a of the base bracket 61, a spring 79 is tensioned between the point of the inner cylinder 63b and the rear end of the cylindrical guide portion 61a.

Reference numeral 81 designates a fixed gear which is used as the fixed side member. This fixed gear 81 is fixed to a fixed member such as a cushion frame and so on through a mounting bracket 82 so as to become coaxial with the above described shaft 62 to be driven. More particularly, an opening 81a for the insertion of the shaft 62 is formed through the center of the fixed gear 81 and an insertion opening 82a is formed through the mounting bracket 82, through which when both openings 81a and 82a are made coincident with each other, the fixed gear 81 and the mounting bracket 82 are coupled with each other by rivets 83 to thereby fix the mounting bracket 82 to the fixed member.

The operation of the rotation adjusting apparatus 60 will be described below.

When the handle 63 is shortened and telescoped into the cylindrical guide portion 61a of the base bracket 61, the bracket 72 protruding from the outer cylinder 63a is in the backward direction and the pin 74 extending therefrom is in the position corresponding to the rear end portion of the long opening ring 75 of the wire assembly 71 so that no traction is applied to the wire 71a. Accordingly, under this condition the guide bracket 66 is rotatably biased downward by the spring 78 and the lock gear 65 engaged through the pin 67 with the guide bracket 66, is engaged with the fixed gear 81

(FIG. 7), so that the roller pin 70 is in rotatable contact with the outer edge of the point of the lock gear 65. Thus, the base bracket 61 is unable to rotate and the shaft 62 is placed in the locked state.

From this condition, if the handle 63 is drawn out halfway or the inner cylinder 63b is drawn out in association therewith, the outer cylinder 63a is drawn out a little and the bracket 72 is moved forward. In this case, however, the amount of movement of the bracket 72 is small so that the pin 74 is only moved to the front end portion of the oblong ring 75 and thus no traction is applied to the wire assembly 71. As a result, the guide bracket 66 and the lock gear 65 are not operated and thence the shaft 62 to be driven is kept in a locked state (FIG. 9A).

Next, if the handle 63 is drawn out to its maximum, the outer cylinder 63a is drawn out by a predetermined length to thereby move the bracket 72 forward so that the wire 71a is drawn taut to thereby rotate the guide bracket 66 upward against the biasing force of the spring 78. When the guide bracket 66 is rotated upward, the shaft 62 is released from its locked position, since the lock gear 65 is rotated by the pressure of the pin 67 on the edge portion of the deformed long opening 68. The lock gear 65 is rotated in the backward direction, or in the direction away from the fixed gear 81 and is thus released from being engaged with the fixed gear 81, thus freeing the shaft 62.

Under this condition, if the handle 63 is lifted upward or lowered, the shaft 62 is rotated through the base bracket 61 to thereby operate the adjusting mechanism which is coupled to the shaft 62 to be driven.

When the shaft 62 is rotated by a desired amount, and the handle 63 is released, the handle 63 is shortened by the biasing force of the spring 79 and then accommodated into the guide cylindrical portion 61a. In other words, the inner cylinder 63b is inserted into the outer cylinder 63a and the outer cylinder 63a is inserted into the cylindrical guide portion 61a. By virtue of this operation, the bracket 72 is moved backward to thereby release traction on the wire assembly 71 and the guide bracket 66 is rotated downward by the biasing force of the spring 78 being returned to its original condition. In association therewith, the lock gear 65 is rotated forward by the engagement of the pin 67 with the long opening 68 and its engagement with the fixed gear 81 so that the shaft 62 is locked in the above rotated condition, thus, the adjusting mechanism is kept at its operational state.

When the adjusting mechanism is further changed from this condition or returned to the original condition once again, the lock releasing operation and the rotation operation of the aforementioned shaft 62 must be carried out.

Figure 10:
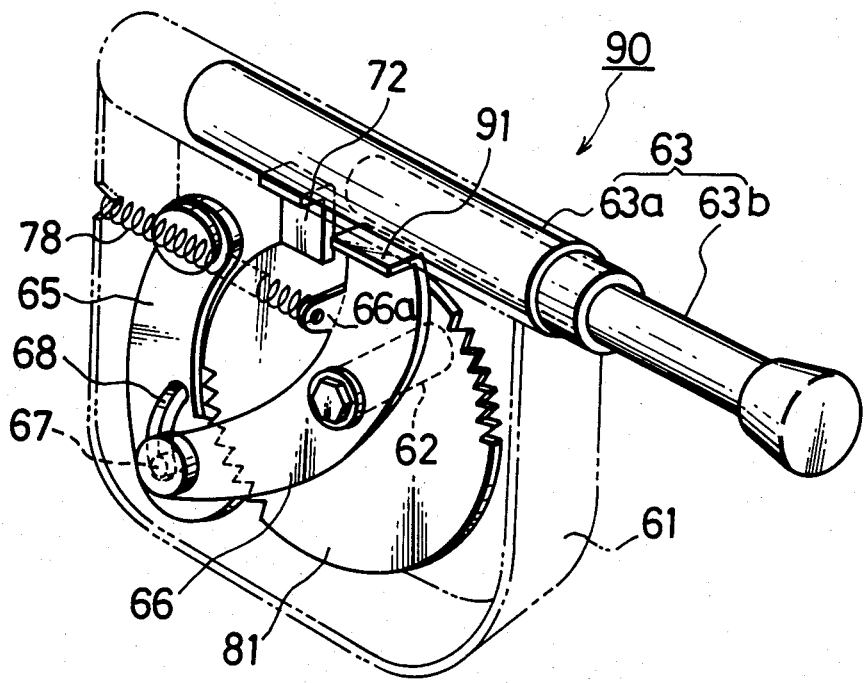
FIG. 10 is a perspective view of a third embodiment of the rotation adjusting apparatus according to the present invention in which a part thereof is omitted.
Figure 11A:
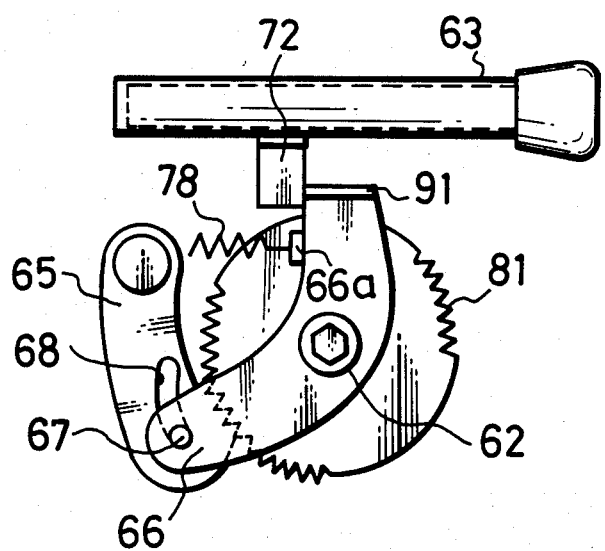
FIGS. 11A and 11B are respectively side views of a main part of the apparatus of FIG. 10 useful for explaining the operation thereof.
Figure 11B:
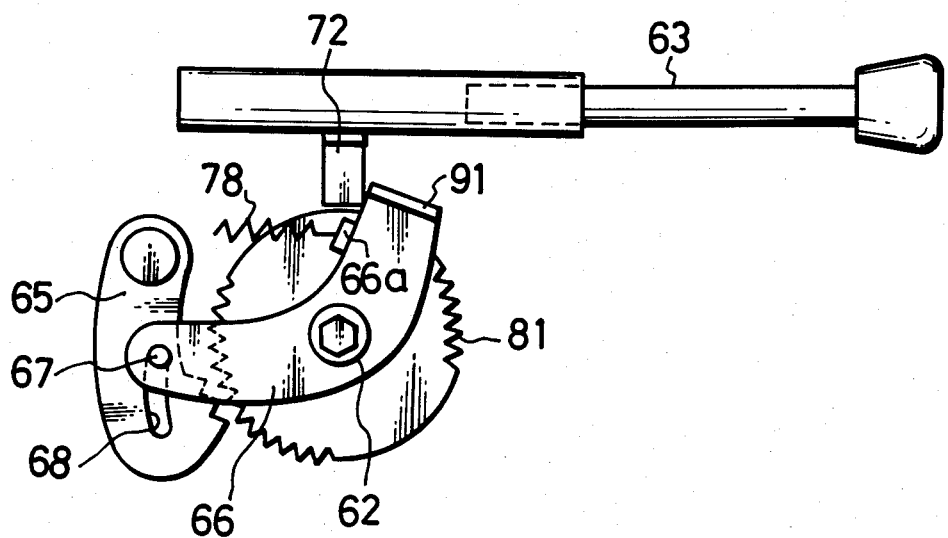

While in the rotation adjusting apparatus 60 of the second embodiment, the guide bracket 66, which engages the lock gear 65 so as to rotate the same, is rotated by the sliding operation of the handle 63 through the wire assembly 71, it is also possible to directly transmit the sliding force of the handle 63 to the guide bracket 66 so as to rotate the same. This is shown in a third embodiment:

FIGS. 10, 11A and 11B are diagrams showing the third embodiment of a rotation adjusting apparatus 90 according to the present invention. As shown in these figures, the wire assembly 71 of the above mentioned second embodiment is not employed. The roller pin 70 and the pin 74 on the bracket 72 are also removed. On the other hand, the pivoted portion of the guide bracket 66 relative to he base bracket 61 is extended near the cylindrical guide portion 61a and bent to form tab 91 that engages the front edge of the protruding bracket 72 which it will be recalled depends from the handle 63. Further, a protruding member 66a is formed at the rear edge of the guide bracket 66. Between the member 66a and the rear edge of the base bracket 61 there is stretched the spring 78 which always biases the lock gear 65 in the direction to engage the fixed gear 81. In this case, the pin 67 which engages the lock gear 65 and the guide bracket 66 is placed in the reverse relation to that of the former embodiment, i.e. the long opening 68 is formed through the lock gear 65 and the pin 67 is planted on the guide bracket 66.

According to this arrangement, if the handle 63 is drawn out, the bracket 72 is moved forward and contacts the bent piece member 91 rotating the guide bracket 66 in the downward direction against the spring force of the spring 78. As a result, the rear end of the guide bracket 66 is rotated upward and the pin 67 presses the edge portion of the long opening 68 and then is moved so that the lock gear 65 is rotated in the backward direction, or in the direction away from the fixed gear 81. The lock gear 85 is thus released from engagement with the fixed gear 81 and the shaft 62 is released similarly to the above-described embodiments.

Further, if the handle 63 is slidably shortened, the bracket 72 is moved in the backward direction, or in the direction away from the bent member 91 of the guide bracket 66 so that the guide bracket 66 is returned to its original state by the biasing force of the spring 78 and in association therewith, the lock gear 65 is rotated forward and into engagement with the fixed gear 81 to thus lock the shaft 62.

The rotation adjusting apparatus 90 constructed as mentioned above can be applied to the adjusting apparatus for operating the adjusting mechanism such as the lifter mechanism of the seat and the like and which can lock the same as the desired position.

Although in each of the first, second and third embodiments of the invention, the handles 4 and 63 are each formed as the two-stage telescope type having an outer cylinder and the inner cylinder, it is also possible to form the handles as a telescope type one having more than two stages. Further, the handles may be each formed as a rod shaped member or cylindrical shaped member. When the handle 63, by way of example, is formed by a singular rod shaped member, the handle extension length and the movable length of the piece member 72 which operates the guide bracket 66 become equal to each other, so that the handle extension length or drawn out length of the handle 63 can be made shorter than that of the telescope type one in a mechanical standpoint.

In addition, the positional relation between, for example, the lock gear 65 and the guide bracket 66 relative to the fixed gear 81 may be reversed, or they may be positioned at the front side of the fixed gear 81 and the tooth portion of the fixed gear 81 is not necessarily formed around the whole of the periphery thereof, but may be formed in accordance with the rotational range of the shaft 62 to be driven. Other portions and members are not limited to those of the above-described embodiments, but can take various modifications and variations.

As set forth above, according to this invention, since the shaft to be driven which is coupled to the adjusting mechanism of the seat is put in its locked state by the engagement of the fixed gear and the lock gear, the shaft to be driven is accurately locked at the desired rotation position. Accordingly, if impact force or load is applied to the shaft to be driven, it can be held in the desired position without being wobbled, slipped and so on. Further, the lock releasing operation is carried out by the sliding operation of the handle and after the lock releasing operation is made, no resistance force and action is applied to the shaft to be driven so that the operational force can be reduced and the rotational operation of the side to be driven can be carried out smoothly. In addition, the rotation adjusting apparatus of this invention is simple in construction and the number of the assembly parts thereof can be reduced, thus the manufacturing costs thereof are lowered.

The above description is given of the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention

1. A rotation adjusting apparatus comprising;
    (a) a base bracket fixed to a shaft to be driven;
    (b) a fixed gear;
    (c) a lock gear rotatably supported by said base bracket and engageable with said fixed gear;
    (d) a guide bracket rotatably supported by said base bracket;
    (e) a handle slidably supported by said base bracket;
    (f) means for coupling said guide bracket to said lock gear; and
    (g) means fixed to said handle and for rotating said guide bracket when said handle is slid relative to said base bracket, said apparatus being so constructed that when said handle is slidably extended most outwardly from said base bracket, said guide bracket is rotated by said rotating means relative to said base bracket and said lock gear is also rotated through said coupling means so that the engagement between said lock gear and said fixed gear is released whereby said base bracket and hence said shaft can be rotatable by said handle.

2. A rotation adjusting apparatus as claimed in claim 1, in which said guide bracket is provided with a cam surface and said rotating means includes a roller which is slidably moved in contact with said cam surface when said handle is slidably extended outwardly.

3. A rotation adjusting apparatus as claimed in claim 1 in which said guide bracket is provided with a roller pin which is slidably in contact with a side edge portion of said lock gear at its side opposing to an engagement portion with said fixed gear.

4. A rotation adjusting apparatus as claimed in claim 1, in which said handle is formed of an outer cylinder and an inner cylinder, each of which is coupled in a telescope fashion.

5. A rotation adjusting apparatus as claimed in claim 1, in which said rotating means is formed of a wire assembly, one end of said wire assembly being engaged with said handle with a predetermined clearance.

6. A rotation adjusting apparatus as claimed in claim 1, in which said guide bracket and said coupling means are formed integral and one end portion thereof is engaged with said rotating means when said handle is slidably extended to thereby rotate said lock gear and hence to release the engagement between said fixed gear and said lock gear.

* * * * *